United States Patent
Truche et al.

(10) Patent No.: US 7,435,951 B2
(45) Date of Patent: Oct. 14, 2008

(54) ION SOURCE SAMPLE PLATE ILLUMINATION SYSTEM

(75) Inventors: Jean-Luc Truche, Loveland, CO (US); Gregor T. Overney, Loveland, CO (US); William D. Fisher, Loveland, CO (US); Richard P. Tella, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 314 days.

(21) Appl. No.: 11/148,786

(22) Filed: Jun. 8, 2005

(65) Prior Publication Data

US 2006/0278824 A1 Dec. 14, 2006

(51) Int. Cl.
*B01D 59/44* (2006.01)
*H01J 49/00* (2006.01)

(52) U.S. Cl. .............. 250/288; 250/281; 250/282; 250/283; 250/284; 250/285; 250/287; 250/290; 250/291; 250/423 P; 250/424

(58) Field of Classification Search ............... 250/282, 250/288, 423, 281, 283, 290, 291, 284, 285, 250/287, 423 P, 424

See application file for complete search history.

(56) References Cited

U.S. PATENT DOCUMENTS

| | | |
|---|---|---|
| 4,898,471 A | 2/1990 | Vaught et al. |
| 4,935,623 A | 6/1990 | Knauer |
| 5,498,545 A | 3/1996 | Vestal |
| 5,595,636 A | 1/1997 | Franzen |
| 5,808,300 A | 9/1998 | Caprioli |
| 5,821,063 A | 10/1998 | Patterson et al. |
| 5,827,659 A | 10/1998 | Patterson |
| 5,840,256 A | 11/1998 | Demers et al. |
| 5,861,623 A | 1/1999 | Park |
| 5,869,240 A | 2/1999 | Patterson |
| 5,969,350 A | 10/1999 | Kerley et al. |
| 6,027,942 A | 2/2000 | Hutchens et al. |
| 6,221,626 B1 | 4/2001 | Bienvenut et al. |
| 6,288,390 B1 | 9/2001 | Sluzdak et al. |
| RE37,485 E | 12/2001 | Vestal |
| 6,353,423 B1 | 3/2002 | Kang et al. |
| 6,423,966 B2 | 7/2002 | Hillenkamp et al. |
| 6,448,065 B2 | 9/2002 | Laugharn, Jr. et al. |
| 6,503,711 B1 | 1/2003 | Krull et al. |
| 6,508,986 B1 | 1/2003 | Anderson et al. |
| 6,617,575 B1 | 9/2003 | Cramer |
| 6,673,315 B2 | 1/2004 | Sheridan et al. |
| 6,707,037 B2 | 3/2004 | Whitehouse |
| 7,145,135 B1 * | 12/2006 | Overney ............... 250/288 |
| 2002/0001562 A1 | 1/2002 | Park |
| 2002/0005478 A1 | 1/2002 | Hillenkamp et al. |
| 2002/0011561 A1 | 1/2002 | Park et al. |
| 2002/0044278 A1 | 4/2002 | Le |
| 2002/0074517 A1 | 6/2002 | Krutchinsky et al. |

(Continued)

*Primary Examiner*—Jack I. Berman
*Assistant Examiner*—Meenakshi S Sahu (57) ABSTRACT

The invention provides a mass spectrometry system ion source containing a sample plate and an illumination device that is configured to produce a light beam that contacts the sample plate surface to define a grazing angle between the light beam and the sample plate surface. The ion source may also contain an imaging device, e.g., a CCD or CMOS camera or the like, for viewing the area. In one embodiment, the imaging device may be connected to a display, e.g., a video monitor. Methods and mass spectrometry systems empliying the ion source are also provided.

26 Claims, 6 Drawing Sheets

U.S. PATENT DOCUMENTS

| | | |
|---|---|---|
| 2002/0094533 A1 | 7/2002 | Hess et al. |
| 2002/0109085 A1 | 8/2002 | Hillenkamp et al. |
| 2002/0123153 A1 | 9/2002 | Moon et al. |
| 2002/0158027 A1 | 10/2002 | Moon et al. |
| 2002/0186367 A1 | 12/2002 | Eytan et al. |
| 2002/0190203 A1 | 12/2002 | Valaskovic et al. |
| 2002/0191864 A1 | 12/2002 | Lennon et al. |
| 2003/0099847 A1 | 5/2003 | Cunningham et al. |
| 2003/0104378 A1 | 6/2003 | Allawi et al. |
| 2003/0136906 A1 | 7/2003 | Marsh |
| 2004/0217278 A1 | 11/2004 | Overney et al. |
| 2007/0051899 A1* | 3/2007 | Truche et al. ............ 250/423 P |

* cited by examiner

ION SOURCE SAMPLE PLATE ILLUMINATION SYSTEM

BACKGROUND

Mass spectrometry is an analytical methodology used for qualitative and quantitative determination of compounds in chemical and biological samples. Analytes in a sample are ionized, separated according to their mass by a spectrometer and detected to produce a mass spectrum. The mass spectrum provides information about the masses and in some cases the quantities of the various analytes that make up the sample. In particular embodiments, mass spectrometry can be used to determine the molecular weight or the molecular structure of an analyte in a sample. Because mass spectrometry is fast, specific and sensitive, mass spectrometer devices have been widely used for the rapid identification and characterization of biological analytes.

During the last few years, matrix-assisted laser desorption/ionization (MALDI) methods have proven to be valuable for the ionization of samples, and have found widespread use in a variety of fields such as genomics and proteomics. In performing MALDI methods, a sample is combined with an organic matrix that co-crystallizes with the sample, and then deposited upon a MALDI sample plate. The MALDI sample plate is placed in an MALDI ion source, and a laser beam vaporizes the sample. During vaporization of the sample, analyte ions are formed. It is thought that the presence of the matrix enables the analyte to be ionized, solving a problem of other methods. MALDI methods may be done at atmospheric pressure (e.g., in AP-MALDI) or at below atmospheric pressure (e.g., in a vacuum or at an intermediate pressure).

In many cases, MALDI ion sources are integrated with an analytical device, e.g., a mass spectrometer, for studying the MALDI-ionized analyte. For the most part, time-of-flight mass spectrometers ("TOF-MS") are used for this purpose, however a variety of other mass spectrometers may also be used, including an ion cyclotron resonance spectrometer (e.g., a Fourier transform ion cyclotron mass resonance spectrometer), an ion trap mass spectrometer (e.g., a high-frequency quadrupole ion trap mass spectrometer), or a hybrid instrument (e.g., a quadrupole/time-of-flight mass spectrometer, Q-TOF).

In ionizing a sample using MALDI, it is generally desirable to view an area on a MALDI sample plate to ensure that a sample has been deposited onto the that area, and to ensure that the MALDI laser is actually going to impact the sample. In particular, there is a need for an imaging system that provides a detailed image of the sample, in particular an image that shows areas of analyte crystals.

The present invention meets this, and other, needs.

SUMMARY OF THE INVENTION

The invention provides a mass spectrometry system ion source containing a sample plate and an illumination device that is configured to produce a light beam that contacts the sample plate surface to define a grazing angle between the light beam and the sample plate surface. The ion source may also contain an imaging device, e.g., a CCD or CMOS camera or the like, for viewing the area. In one embodiment, the imaging device may be connected to a display, e.g., a video monitor. Methods and mass spectrometry systems employing the ion source are also provided. The invention finds use in a variety of analytical methods. For example, the invention finds use in chemical, environmental, forensic, food, pharmaceutical and biological research applications.

The invention described herein provides an effective means for illuminating a sample plate within an ion source so that sample-containing areas of the sample plate can be readily distinguished from non-sample containing areas. As such, the instant methods may be used to identify regions of a sample plate that contain sample. Areas of a sample that contain analyte-containing sample may therefore be identified using the invention, and ionized. The invention finds particular use in identifying low volume samples, samples with low concentration of analyte and/or low concentration of matrix, and samples that are present on the surface of a textured sample plate. Prior art ion source sample plate illumination devices do not provide these features.

The invention finds particular use in illuminating sample plates that are present in a matrix-assisted ion source (e.g., AP-MALDI or below atmospheric pressure MALDI ion source).

DEFINITIONS

Unless defined otherwise, all technical and scientific terms used herein have the same meaning as commonly understood by one of ordinary skill in the art to which this invention belongs. Still, certain elements are defined below for the sake of clarity and ease of reference.

The term "using" is used herein as it is conventionally used, and, as such, means employing, e.g. putting into service, a method or composition to attain an end. For example, if a program is used to create a file, a program is executed to make a file, the file usually being the output of the program. In another example, if a file is used, it is accessed, read, and the information stored in the file employed to attain an end.

An "ion source" is any apparatus that produces ions for analysis in a mass spectrometry system. Exemplary ion sources include electron impact (EI) and matrix-based ion sources, as well as others. An ion source may be operated at any ambient pressure (e.g., between about $10^{-8}$ Torr to about 2,500 Torr), where "ambient pressure" is the pressure within the enclosure of the ion source. The ambient pressure within an ion source may be high vacuum (e.g., from about $10^{-8}$ Torr to about $10^{-4}$ Torr) or at any pressure the range of 100 mTorr to about 2,500 Torr, including atmospheric pressure (approximately 760 Torr, i.e., between about 700 Torr to about 820 Torr), for example. In other words, an ion source may be operated at atmospheric pressure, above-atmospheric pressure, or below atmospheric pressure.

The term "matrix-based ion source" refers to an ion source in which sample is combined with a matrix, generally an organic matrix, and deposited onto a sample plate prior to its ionization. A matrix-based ion sources does not rely on a volatile solvent for ionization. Exemplary matrix-based ion sources include fast atom bombardment (FAB) ion sources and matrix-assisted laser desorption ionization (MALDI) ion sources. The term "MALDI", as used herein, encompasses atmospheric pressure MALDI (AP-MALDI), as well as below atmospheric pressure MALDI (e.g., vacuum or intermediate pressure MALDI). Accordingly, a reference to a MALDI device, e.g., a MALDI ion source or a MALDI sample plate, indicates that device that is adapted for use with AP-MALDI or adapted for use with below atmospheric pressure MALDI (e.g., vacuum or intermediate vacuum MALDI) methods.

An "ion source sample plate" or "ion source configured for use in an ion source" is a plate of samples suitable for use within an ion source of a mass spectrometry system. An ion source sample plate can be of any shape, e.g., circular, square, rectangular, oval, etc., and may be made from any material, e.g., any metal. Sample on the surface of an ion source sample plate is ionized in the ion source.

The term "adjacent" means, near, next to or adjoining. Something adjacent may also be in contact with another component, surround the other component, be spaced from the other component or contain a portion of the other component.

A "grazing angle" is an angle that is at or between 0° to 15°

DETAILED DESCRIPTION OF THE INVENTION

The invention provides a mass spectrometry system ion source containing a sample plate and an illumination device that is configured to produce a light beam that contacts the sample plate surface to define a grazing angle between the light beam and the sample plate surface. The ion source may also contain an imaging device, e.g., a CCD or CMOS camera or the like, for viewing the area. In one embodiment, the imaging device may be connected to a display, e.g., a video monitor. Methods and mass spectrometry systems employing the ion source are also provided. The invention finds use in a variety of analytical methods. For example, the invention finds use in chemical, environmental, forensic, food, pharmaceutical and biological research applications.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention.

The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a", "an," "said" and "the" include plural referents unless the context clearly dictates otherwise.

Sample Plate Illumination Apparatus

Figure 1:
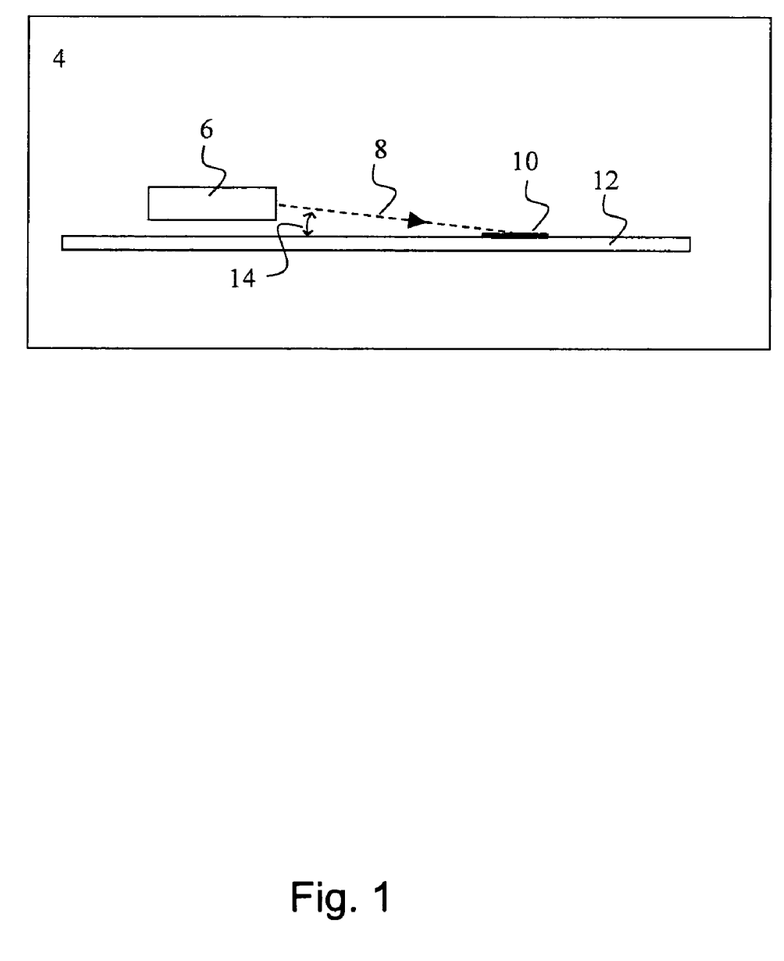
FIG. 1 schematically illustrates a first embodiment of the invention.

As noted above, the invention provides an ion source. The general features of an ion source according to the invention are illustrated in FIG. 1. With reference to FIG. 1, an ion source 4 contains a sample plate 12 and an illumination device 6. The illumination device is configured to a light beam that contacts the sample plate surface to define a grazing angle between the light beam and the sample plate surface. At least part of the surface of the sample plate is illuminated by the illumination device. In certain embodiments, therefore, the illumination device is configured to produce a light beam having a longitudinal axis 8 that impinges on an area 10 of the sample plate at a grazing angle 14 with respect to the surface of the sample plate. The illumination device generally provides directed light that illuminates the area from one side.

The illuminated area may contain a deposited sample that is to be ionized, and, in certain embodiments, the illuminated area may contain the impact point of the ionizing laser employed in the ion source. The area illuminated may be entire surface of a deposited sample, or any region thereof. In particular embodiments, the illuminated area is at least the size of a deposited sample or smaller than a deposited sample. The size of the illuminated area may be adjusted as needed.

The grazing angle 14 is generally sufficient to minimize light scattering and reflection from the surface of the sample plate, and provide reflected, diffracted and/or scattered light from any three dimensional structures on the surface of the sample plate, thus providing good contrast between areas that contain sample and areas that do not contain sample. In certain embodiments, the grazing angle 14 may be in the range of about 0° to about 15° and, in certain embodiments, may be in the range of about 0° to about 5° or about 5° to about 10°, for example. In certain embodiments, therefore, the angle of incidence of the directed light with respect to the surface of the sample plate (i.e., the angle at which the light impacts the sample plate surface relative to a line perpendicular to the surface at the point of impact) can be large, e.g., in the range of about 75° to about 90° and, in certain embodiments, may be in the range of about 85° to about 90° or about 80° to about 85°, for example. In certain embodiments, the longitudinal axis of the light beam may be substantially parallel to (i.e., within 15° of) the surface of the sample plate.

Any type of light may be employed for illumination. For example, any wavelength or range of wavelengths in the range of about 600 nm to about 2000 nm may be employed. The light may be polarized or non-polarized, for example. Accordingly, a wide variety of light sources may be used in the illumination device employed herein, including light sources containing a halogen or LED lamp (e.g., a bright light LED lamp). Although not required, the illumination device may contain mirrors, lenses and other optical components for manipulating light such that it can be directed to the area. For example, illuminating light may be directed by a mirror towards the sample plate at a grazing angle, or light may be focused towards the sample plate using a lens.

In general, the illumination device produces directed light and the area is directly illuminated by the illumination device (i.e., the area is illuminated by incident light, not light reflected off one or more walls of the ion source). In this context directed light is, for example, a cone of light that that is most intense at the center of the cone, rather than at its edges, and has an cone angle in the range of about 0° to 45°, e.g., in the range of about 0° to 30°. In other words, in one embodiment, directed light employed in the invention described herein is in the form of a cone having an energy distribution such that 95% of the energy of the light is within 15° of the central longitudinal axis of the cone. In one embodiment, directional light can be produced by guiding light through an optical fiber. Since only light inside the acceptance angle of the fiber can enter the fiber and be conducted through the fiber via total internal reflections, the light that exits the fiber is directional and generally has a cone with an opening angle that is comparable to the acceptance angle. Directional light can also be made using a focusing component, e.g., a refractive or reflective element (e.g., a lens). Directional light can also be made using an optical fiber and a focusing component. Directed light may have a cone angle in the range of about 0° to about 10°, about 10° to about 20° about 20° to about 30°, about 30° to about 40° or about 40° to about 45°. In other words, the illumination device employed herein does not emanate light in all directions.

Depending on the type of illumination device used, which may or may not include additional optical elements, and the size of the area to be illuminated, the optimal distance between the illumination device and the area to be illuminated may vary greatly, but is readily determined. In certain embodiments, the distance between the illumination device and the area to be illuminated is in the range of about 5 mm to about 10 cm, e.g., about 2 cm to about 5 cm, about 5 mm to about 2 cm or about 8 mm to about 10 mm, for example.

The sample plate to be illuminated may be of any shape and may be made of any material. The surface of the sample plate to be illuminated is made of any material, including metal (e.g., gold or stainless steel or the like) or a metal nitride such as titanium nitride. The surface may be polished or irregular. The sample plate may be any type of sample plate, e.g., an AP-MALDI sample plate or a below atmospheric pressure (e.g., vacuum or intermediate vacuum) MALDI plate, for example.

As would be readily apparent to one of skill in the art, the illumination device should be adjacent to, but distanced from the sample plate to allow for free movement of the sample plate in the plane of its surface. In certain embodiments, therefore, the distance between the illumination device and the sample plate may be a minimum of 0.1 mm (e.g., in the range of 0.1 mm to about 10 mm, about 0.2 mm to about 2 mm or about 0.5 mm to about 1 mm).

Figure 2:
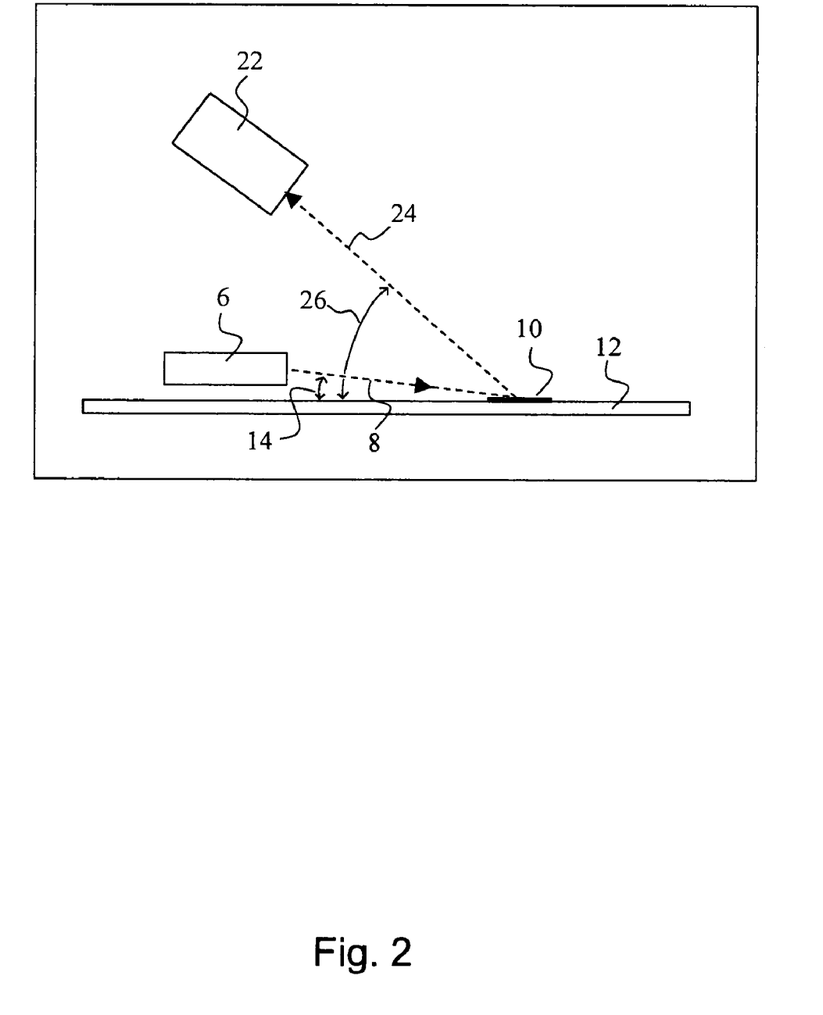
FIG. 2 schematically illustrates a second embodiment of the invention.

As illustrated in FIG. 2, the ion source of the invention may further contain an imaging device for imaging at least part of the area illuminated by the illumination device. As illustrated in FIG. 2, light 8 is directed towards area 10 by illumination device 6, and light 24 reflected, diffracted and/or scattered by area 10 (i.e., light that is reflected, diffracted and/or scattered by area 10 towards the imaging device) is detected by imaging device 22. Imaging device may be any type of camera, although a camera that provides a digitized output (i.e., a digital camera) is most readily employed. In certain embodiments, the camera employed may be a charged-coupled device (CCD) or complementary metal-oxide-semiconductor (CMOS) camera.

Figure 3A:
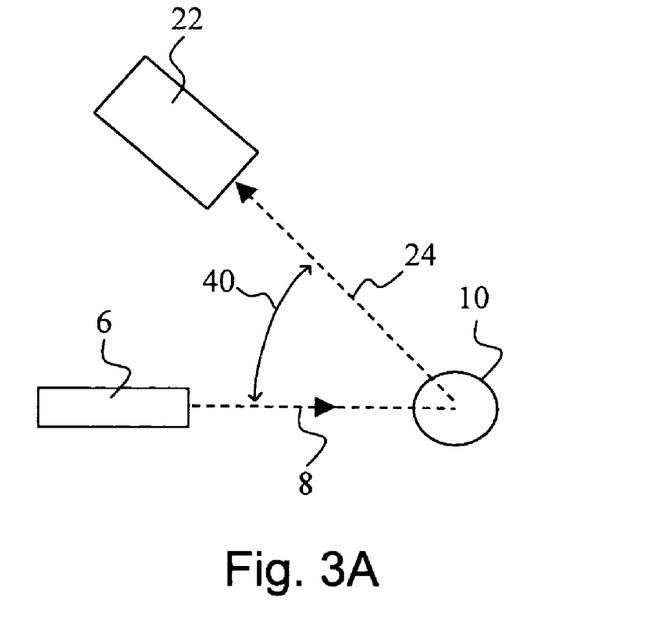
FIG. 3A schematically illustrates a third embodiment of the invention.
Figure 3B:
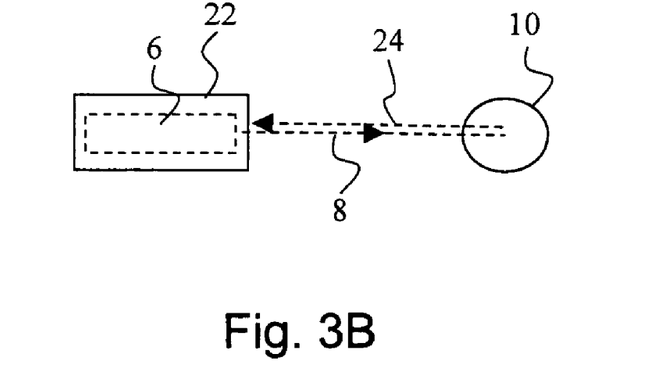
FIG. 3B schematically illustrates a fourth embodiment of the invention.

As illustrated in FIGS. 2, 3A and 3B, the positioning of the imaging device relative to the illumination device and the surface of the sample plate may vary greatly. The imaging device may be positioned to detect light reflected, diffracted and/or scattered, or absorbed and emitted via quantum process at angle 26 with respect to the surface of sample plate 12. Angle 26 may be any angle suitable for imaging the illuminated region. In particular embodiments, angle 26 is greater than angle 14, and is in the range of about 20° to about 90°, e.g., about 30° to about 60° or about 40° to about 50°, relative to the surface of the sample plate. FIGS. 3A and 3B illustrate an embodiment of the subject apparatus viewed from the "z" direction (i.e., from the above the surface of the sample plate, where the "x" and "y" directions are parallel to the surface of the sample plate). As illustrated in FIG. 3A and as viewed from the z direction, the illuminating light 8 and detected light 24 form angle 40. Angle 40 may be any angle in the range of 0° to 180° in either direction (i.e., clockwise or anti-clockwise). As illustrated in FIG. 3B, illuminating light 8 and detected light 24 may be co-planer (i.e., having an angle of 0°). In such embodiments, the illumination device 6 may be beneath the imaging device 22 in the z direction.

In general, the imaging device is positioned and configured to avoid direct light from the illumination device and maximize contrast between sample-containing and non-sample containing areas of the plate. In certain embodiments the illuminated area may be imaged and viewed from the same side with respect to the surface of the sample plate. Accordingly, in certain embodiments, angle 40 may in the range of about 0°, 0° to about 5°, about 5° to about 10°, about 10° to about 20°, or about 20° to about 30°, in either direction.

Detected light 24 may be directed to imaging device 22 via any number of mirrors, lenses or other optical components that may be present between imaging device 22 and illuminated area 8.

In certain embodiments, the imaging device receives light from the illuminated area such that the light detector of the imaging device (i.e., the array of photodetectors or pixel cells) lies perpendicular to the direction of light. In other words, in certain embodiments, light entering imaging device may travel in a direction that is perpendicular to the surface of the light detector employed in the imaging device. In other embodiments, the light entering the imaging device may travel in a direction that is not perpendicular to the surface of the light detector.

Figure 4:
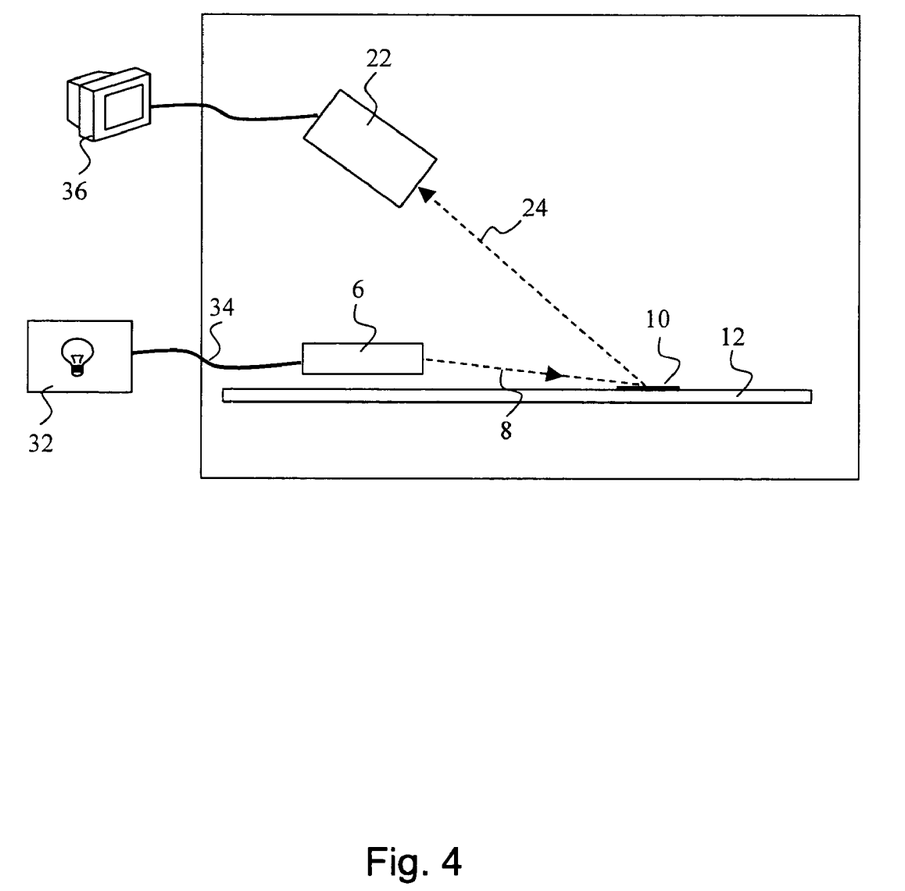
FIG. 4 schematically illustrates a fifth embodiment of the invention.

In a further embodiment of the invention and as illustrated in FIG. 4, the imaging device 22 may produce a signal representing an image of the illuminated area (e.g., analog or digital signals representing the image) that is transferred to signal processing device 36 for processing. The signal processing device may be a computer, and the signal may be stored as a file in computer memory. The stored file may be accessible to image analysis software, and such software may be executed by the computer to analyze the image. In one embodiment, signal processing device 36 is a display, e.g., a monitor such as a computer monitor or the like.

In a further embodiment of the invention and as further illustrated in FIG. 4, the illumination device 6 may be connected to a light source 32 via a light guide 34. In one embodiment, the illumination device 6 may contain the light-emitting end (i.e., the light exit end) of a fiber optic light guide that is connected to a suitable light source at its other end. Such a fiber optic illumination device may illuminate area 10 directly from its light-emitting end, or indirectly via one or more optical components (e.g., a focusing lens or mirror or the like) that is positioned in the light path.

In many embodiments, the illumination device 6 and imaging device 22 are generally within the ion source, whereas the light source 32 and signal processing device 36 (which may be generally employed as a display for viewing a sample) may be exterior to the ion source.

The above-described sample plate illumination apparatus may be employed in a variety of systems in which it is desirable to produce an image of an area of a ion source sample plate.

In one embodiment, the above-described sample plate illumination apparatus is employed to produce an image of an area of a surface of a sample plate in which sample-containing areas are readily distinguishable from non-sample containing areas. The image produced may be employed in a number of methods. For example, the image may be analyzed, and sample parameters describing the shapes, dimensions and locations of samples on the sample plate may be determined (either manually or using software). The sample parameters for a plate may be stored in a file, in memory, and used by ion source to direct a laser to a sample-containing area on that sample plate. Such methods are generally described in great detail in co-pending U.S. patent application Ser. No. 10/429,234, filed on May 2, 2003 and published as U.S. 20040217278, which patent application is incorporated herein in its entirety for all purposes.

In one embodiment, therefore, the invention provides a method of illuminating an area on a surface of a sample plate. The method generally involves illuminating the area by directing light onto the area at a grazing angle with respect to the surface of the sample plate. In certain embodiments, the method may further involve producing an image of the area using an imaging device. In other embodiments, the method may further involve storing the image on a computer-readable medium, and/or analyzing the image to produce a sample parameter file. The sample parameter file may be employed by a ion source to direct a laser to a sample-containing region of the sample plate.

In another embodiment, the above-described sample plate illumination apparatus is employed to produce an image of a sample plate that is present in a ion source. Accordingly, the invention provides a ion source containing an illumination device configured to direct light to an area of a sample plate at a grazing angle with respect to the surface of the sample plate, as described above. In this embodiment, the illumination system may be employed to produce an image of an area of a sample plate, and show that image on a display, e.g., a monitor. In certain embodiments, the laser impact point (i.e., the point of impact of the ionizing laser of a ion source on the surface of a sample plate) of the ion source may also be shown on the display. The position of a sample-containing area of a sample plate may therefore be viewed in relation to the point of impact of the ionizing laser on the sample plate, and the position of the sample plate can be adjusted accordingly (e.g., manually) to ensure that the laser impacts a sample-containing area when fired.

In this embodiment, an area of a sample plate can be imaged prior to, during or after ionization of a sample in the illuminated area. Further, the sample plate can be moved in the plane of the surface of the sample plate (i.e., in the x-y plane) as the sample plate is being imaged, allowing an operator to identify areas containing sample, and direct an ionizing laser at those areas without undue effort.

Figure 5:
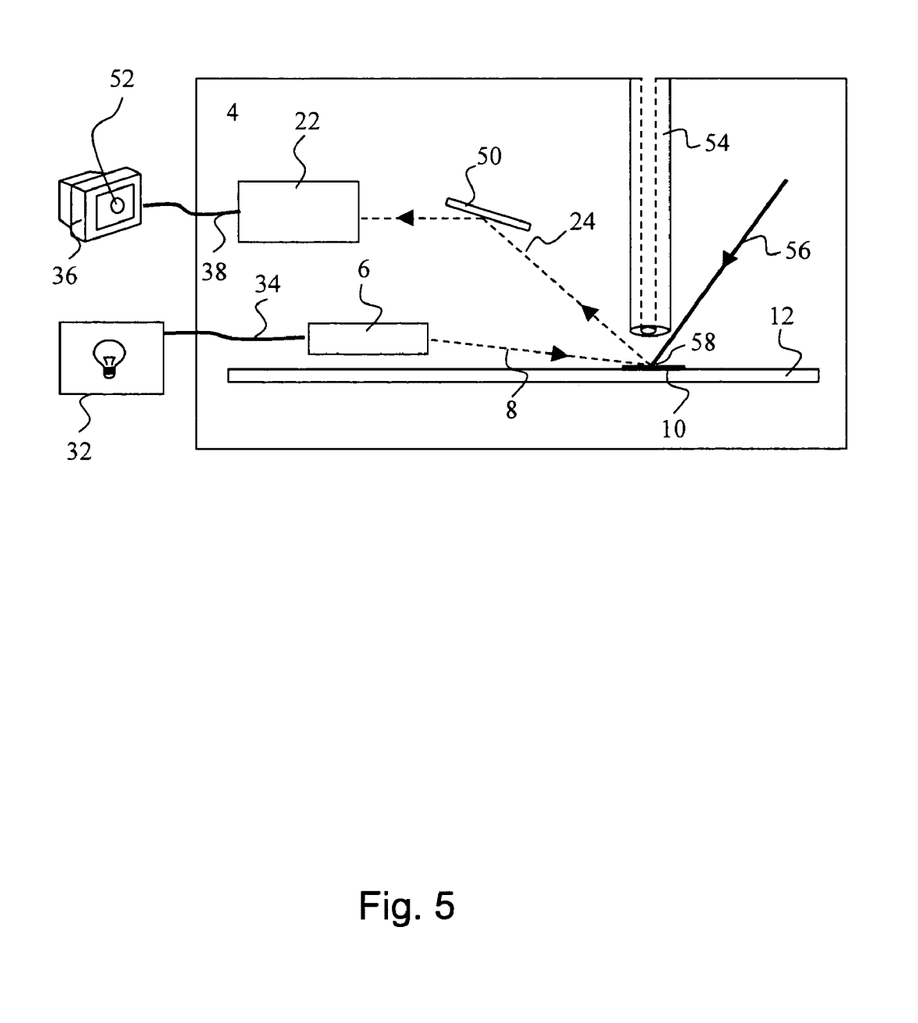
FIG. 5 schematically illustrates a sixth embodiment of the invention.

The general features of an exemplary ion source in accordance with the invention are illustrated in FIG. 5. With reference to FIG. 5, an exemplary ion source 4 contains an illumination device 6 for directing light 8 to an area 10 of sample plate 12 at a grazing angle with respect to the surface of the sample plate. Ion source 4 also contains an imaging device 22 for receiving light 24 reflected from area 10. In this exemplary ion source, light 24 is reflected off mirror 50 prior to its detection by imaging device 22. Ion source 4 also contains ionizing laser 56 directed to laser impact point 58 that is within area 10. Ion source 4 also contains ion exit capillary positioned above laser impact point 58 for transporting ions out of ion source 4. In the embodiment shown in FIG. 5, the illumination device 6 is a fiber optic illumination device that is connected to exterior light source 32 via fiber optic light guide 38. Imaging device 22 is connected to exterior display 36 via cable 38. A sample-containing area 52 can be imaged on monitor 36.

Again, the ion source described above may be any type of ion source, including, but not limited to an AP-MALDI ion source or a below atmospheric pressure (e.g., vacuum or intermediate vacuum) MALDI ion source.

In view of the above, the invention also provides a method of ionizing a sample on a sample plate. In general, this method involves illuminating a sample by directing light onto the sample at a grazing angle with respect to the surface of the sample plate, and ionizing the sample. Once ions are produced, the ions exit the ion source and travel towards a mass spectrometer, where they are analyzed.

Mass Spectrometer Systems

Figure 6:
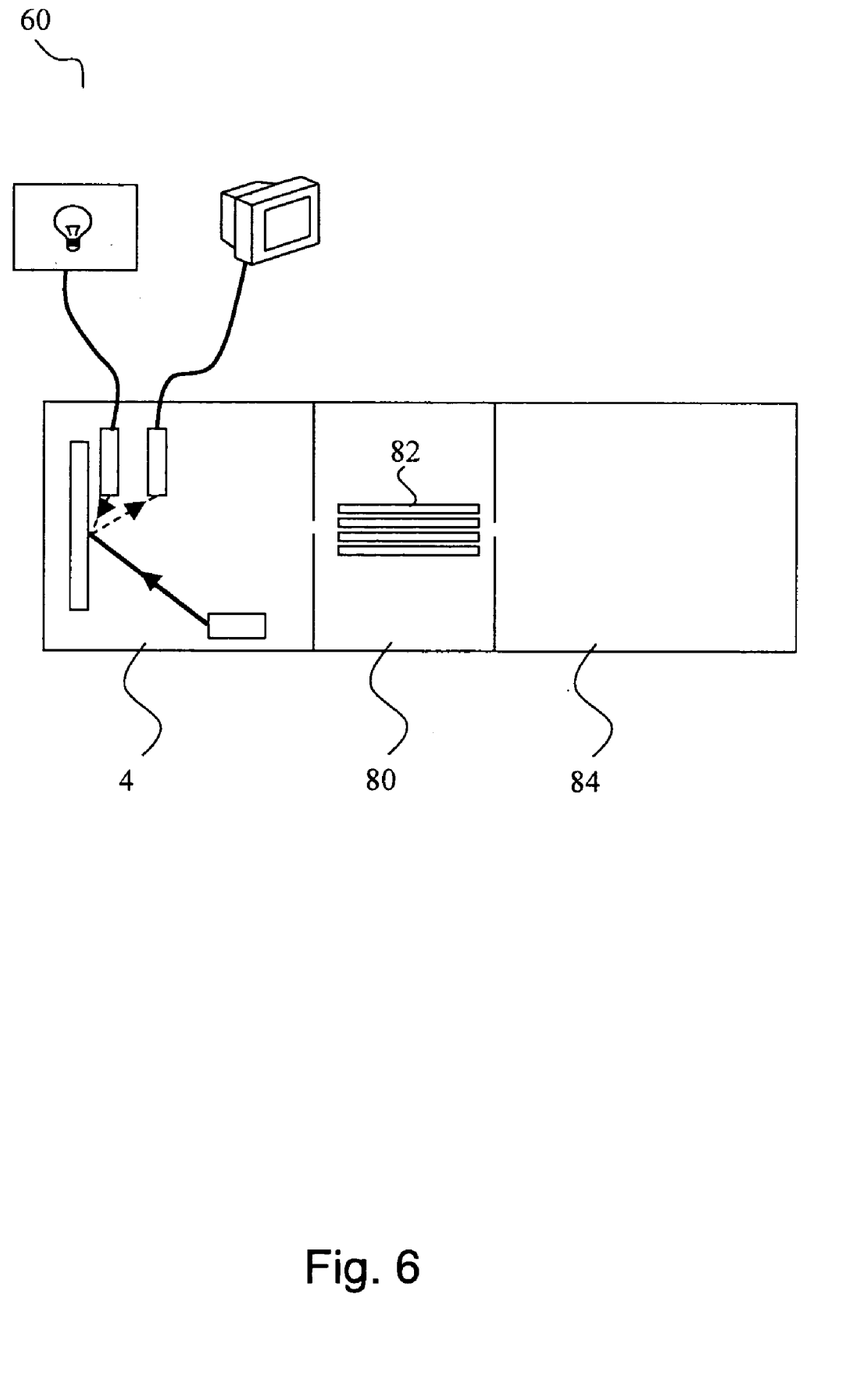
FIG. 6 schematically illustrates an exemplary mass spectrometer system of the invention.

The invention also provides a mass spectrometer system containing an above-described ion source. Mass spectrometer systems containing ion sources are generally well known in the art and therefore do not need be described in any great detail herein. In general terms, the mass spectrometer system 60 contains an ion source 4 and a mass analyzer 84 containing an ion detector, connected by one or more intermediate chambers. An exemplary mass spectrometer system of the invention that contains an MALDI ion source is shown in FIG. 6. As is conventional in the art, the ion source and the mass analyzer are separated by at least one intermediate vacuum chamber 80 through which ions are transported after they have exited the ion source 4 via an ion exit orifice. More or less vacuum stages may be employed depending on the requirements of the system.

Mass analyzer and detector 84 may comprise a quadrupole, triple quadrupole, three dimensional ion trap, linear ion trap, time-of-flight (TOF), magnetic sector, Fourier transform ion-cyclotron resonance (FTICR), orbitrap or other mass to charge analyzer known in the art, for example.

In use, if MALDI ion source 4 is held at atmospheric pressure, intermediate chamber 80 is held at a pressure that is around two orders of magnitude less than the ambient pressure, and mass analyzer 84 is held at a pressure of around two to four orders of magnitude less than that of the intermediate chamber. The ions exit ion source 4 via its ion collection capillary and are swept into the vacuum chamber 80, usually via a skimmer, in a stream of gas due to the pressure difference between ion source 4 and chamber 80. The ions pass through chamber 80 (and any ion guide 82, ion beam shaping or focusing lenses that may be present) and enter mass analyzer 84. Mass analyzer 84 determines the m/z ratio of the ions, and thus is useful for determining molecular weights of analytes in the sample. Ion guide 82 may be a multipole ion guide, a segmented multipole ion guide, a sequential disk RF ion guide, an ion funnel or other ion guide known in the art. Ion guide 82 may extend continuously into one or more vacuum pumping stages or may begin and end in a single vacuum stage.

The invention finds use in methods of sample mass analysis, where a sample may be any material deposited and crystallized onto the surface of a sample plate or mixture of materials. Samples typically contain one or more components of interest. Samples may be derived from a variety of sources such as from foodstuffs, environmental materials, a biological sample such as tissue or fluid isolated from a subject (e.g., a plant or animal subject), including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components), or any biochemical fraction thereof.

Kits

Kits for retrofitting ion sources are also provided. Such kits include any of the compositions of the apparatus, including an illumination device and an imaging device, as discussed above. The kit may also contain instructions for installing the apparatus into a ion source.

Instructions for practicing the methods are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

It is evident from the above discussion that the invention provides an important means for illuminating a sample plate so that sample-containing regions can be readily distinguished from areas that do not contain sample. Accordingly, the present invention represents a significant contribution to the mass spectrometry arts.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An ion source comprising:
   (a) a laser for ionizing a sample;
   (b) a sample plate surface spaced from the laser, the sample plate surface for receiving a sample; and
   (c) an illumination device adjacent to the sample plate surface, the illumination device for producing a light beam, the light beam contacting the sample plate surface to define a grazing angle between the light beam and the sample plate surface and wherein the sample plate surface is illuminated.

2. The ion source of claim 1, wherein said grazing angle is in the range of about 0° to about 15°.

3. The ion source of claim 1, wherein said grazing angle is in the range of about 0° to about 10°.

4. The ion source of claim 1, wherein said ion source comprises a matrix-based ion source.

5. The ion source of claim 4, wherein said matrix-based ion source comprises a matrix-assisted laser desorption ionization (MALDI) ion source.

6. The ion source of claim 5, wherein said MALDI ion source is operated at atmospheric pressure.

7. The ion source of claim 5, wherein said MALDI ion source is operated at an ambient pressure in the range of about $10^{-8}$ Torr to about 2500 Torr.

8. The ion source of claim 1, wherein said illumination device comprises a fiber optic light guide connected to a light source.

9. The ion source of claim 8, wherein said light source is exterior to said ion source.

10. The ion source of claim 1, further comprising an imaging device for viewing said sample plate surface.

11. The ion source of claim 10, wherein said imaging device is a CCD or CMOS camera.

12. The ion source of claim 10, wherein said imaging device is coupled to a display that is exterior to said ion source.

13. The ion source of claim 1, wherein said illumination device illuminates an area that encompasses an impact point of said laser.

14. A mass spectrometer system, comprising:
   a) an ion source comprising:
      (i.) a laser for ionizing a sample;
      (ii.) a sample plate surface spaced from the laser, the sample plate surface for receiving a sample; and
      (iii.) an illumination device adjacent to the sample plate surface, the illumination device for producing a light beam, the light beam contacting the sample plate surface to define a grazing angle between the light beam and the sample plate surface and wherein the sample plate surface is illuminated;
   b) an ion transport device; and
   c) a mass spectrometer.

15. The mass spectrometer system of claim 14, wherein said grazing angle is in the range of about 0° to about 15°.

16. The mass spectrometer system of claim 14, wherein said grazing angle is in the range of about 0° to about 10°.

17. The mass spectrometer system of claim 14, wherein said mass spectrometer is selected from the group consisting of a quadrupole, a triple quadrupole, a three dimensional ion trap, a linear ion trap, a time-of-flight (TOF), a magnetic sector and a Fourier transform ion-cyclotron resonance (FTICR) mass spectrometer.

18. The mass spectrometer system of claim 14, further comprising an imaging device for imaging said sample plate surface.

19. The mass spectrometer system of claim 18, further comprising a display connected to said imaging device.

20. The mass spectrometer system of claim 15, wherein said ion source is operated at atmospheric pressure.

21. The mass spectrometer system of claim 15, wherein said ion source is operated at an ambient pressure in the range of about $10^{-8}$ Torr to about 2500 Torr.

22. A method of producing an image of an area on a surface of a sample plate in an ion source, comprising:
   illuminating said area by directing a light beam onto said area, said light beam contacting the sample plate surface to define a grazing angle between the light beam and the sample plate surface and wherein the sample plate surface is illuminated; and
   producing an image of said area using an imaging device.

23. The method of claim 22, wherein said grazing angle is in the range of about 0° to about 10°.

24. The method of claim 22, further comprising storing said image on a computer-readable medium.

25. A method for positioning a sample plate in an ion source, comprising:
   obtaining positional information of a sample located on a surface of said sample plate by:
      a) illuminating said sample by directing a light beam onto said sample, said light beam contacting said sample to define a grazing angle between the light beam and the surface of the sample plate;
      b) producing an image of said sample using an imaging device; and
   using said positional information to position said sample plate in an ion source so that said sample can be ionized.

26. The method of claim 22, wherein said grazing angle is in the range of about 0° to about 15°.

* * * * *